July 1, 1924.  1,499,883
H. SILVERNAIL
RIVETING DEVICE FOR AUTOMOBILE BRAKE BANDS
Filed May 19, 1923
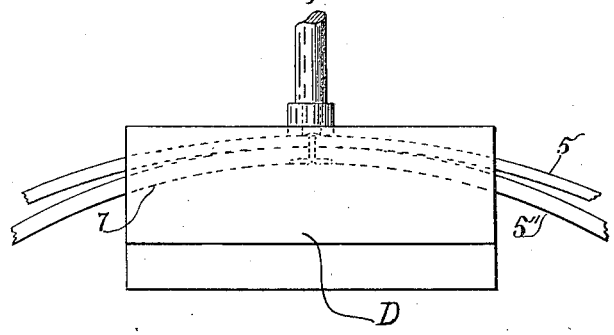
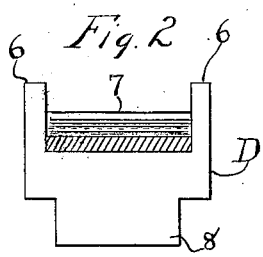
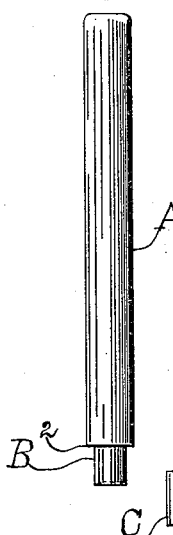
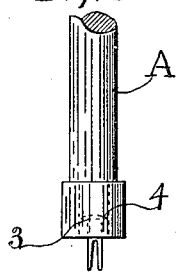
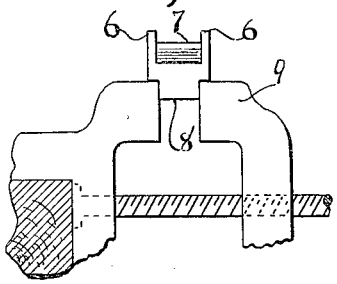
INVENTOR
Howard Silvernail
BY
F. N. Gilbert
ATTORNEY Patented July 1, 1924.

1,499,883

UNITED STATES PATENT OFFICE.

HOWARD SILVERNAIL, OF BINGHAMTON, NEW YORK.

RIVETING DEVICE FOR AUTOMOBILE BRAKE BANDS.

Application filed May 19, 1923. Serial No. 640,137.

*To all whom it may concern:*

Be it known that I, HOWARD SILVERNAIL, a citizen of the United States, residing at Binghamton, in the county of Broome and State of New York, have invented certain new and useful Improvements in Riveting Devices for Automobile Brake Bands, of which the following is a specification.

My invention relates to devices for riveting automobile brake bands and includes a tool by which the rivets are inserted and an anvil adapted to support the bands being riveted together. The anvil which supports the bands being riveted also acts as means for clenching the rivets to the bands.

With these objects in view, my invention consists in the following certain novel features of construction and arrangement of parts as will be hereinafter fully described and pointed out in the claims, reference being had to the accompanying drawings, in which:

Figure 1 is a side view of a part of my device.

Fig. 2 is an end view of a part of my device.

Fig. 3 is a side elevation of a part of my device.

Fig. 4 is a side elevation of a part of my device.

Fig. 5 is a side view of a part of my device.

Fig. 6 is an end view of a part of my device in position.

The same reference characters denote like parts in each of the several figures of the drawings.

In carrying out my invention, I provide a riveting tool having a body portion A, formed preferably of metal; its lower end B being reduced in size, smaller than the body portion A, thereby producing the shoulder 2; this reduced portion forming a setting die on which I removably mount the rubber or other form of elastic band C, which in length projects beyond setting die B and thereby forming an inner recess or set 3, in the space between the outer end of C and the die B. This recess 3 is adapted to yieldingly receive and hold the head of the rivet 4 and supports the rivet 4 in a vertical position, ready for entering the bands, 5. 5'.

As a further part of my device, I provide an anvil D, having two vertical, upward parallel projecting sides 6. 6 between which I have the curved bottom surface 7 and projecting from the under side of D, I have the shank 8, adapted to enter and be supported between the jaws of a vise 9.

In the operation of my device, when I desire to rivet the brake bands, I first mount the anvil D securely between the jaws of the vise 9 in position for riveting, I then place the band sections 5. 5' one over the other, in the anvil D, between the sides 6. 6, as shown in Figs. 1 and 2; I then mount the rubber band C on the setting die B and in the recess thereby formed I press the head of the rivet 3, thus supporting it in a vertical position, ready for insertion in the bands. I then take hold of the body A, which supports the rivet 3 and place the rivet 3 at the given point for insertion and striking the body A with a hammer, I force the rivet thru the bands and clench it in the usual manner by the pressure of the setting die B. The yielding supporting rubber band C permits the setting die B to drive the rivet into place, which actions also removes the rivet from the supporting recess, freeing the set. This operation is repeated until the desired number of rivets are mounted in the band.

Having thus described my invention what I claim as new and for which I desire Letters Patent is as follows:

A device for riveting automobile brake bands comprising a riveting tool having a body portion, provided with a setting die, and a yielding band surrounding said die and normally extending beyond the same to form a recess in which the head of a rivet is adapted to be inserted, and an anvil having a segmental band receiving and supporting surface, upwardly projecting guide ribs on each side of said band receiving and supporting surface, and a shank projecting from the under side of said anvil adapted to be held in the jaws of a vise.

In testimony whereof I have affixed my signature.

HOWARD SILVERNAIL.